United States Patent
Park et al.

(10) Patent No.: US 11,993,254 B2
(45) Date of Patent: May 28, 2024

(54) ROUTE SEARCH SYSTEM AND METHOD FOR AUTONOMOUS PARKING BASED ON COGNITIVE SENSOR

(71) Applicants: Hyundai Motor Company, Seoul (KR); Kia Corporation, Seoul (KR)

(72) Inventors: Kyujin Park, Namyangju-si (KR); Junho Yang, Seongnam-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 318 days.

(21) Appl. No.: 17/528,350

(22) Filed: Nov. 17, 2021

(65) Prior Publication Data
US 2022/0203967 A1    Jun. 30, 2022

(30) Foreign Application Priority Data
Dec. 30, 2020    (KR) .................. 10-2020-0188348

(51) Int. Cl.
| | |
|---|---|
| *B60W 30/06* | (2006.01) |
| *B60R 21/0134* | (2006.01) |
| *B60W 30/08* | (2012.01) |
| *B60W 30/10* | (2006.01) |
| *B60W 40/02* | (2006.01) |
| *B60W 50/00* | (2006.01) |

(Continued)

(52) U.S. Cl.
CPC ........ *B60W 30/06* (2013.01); *B60W 60/0011* (2020.02); *B60W 60/0015* (2020.02); *G06V 20/58* (2022.01); *G06V 20/586* (2022.01)

(58) Field of Classification Search
CPC .................................................. B60W 30/06
See application file for complete search history.

(56) References Cited

U.S. PATENT DOCUMENTS

| | | | |
|---|---|---|---|
| 2017/0232967 A1* | 8/2017 | Tomatsu .......... | G08G 1/096783 |
| | | | 701/117 |
| 2017/0259850 A1* | 9/2017 | Yamashita ............... | B62D 6/00 |
| 2020/0166950 A1* | 5/2020 | Hase .................... | G05D 1/0088 |

(Continued)

FOREIGN PATENT DOCUMENTS

KR            102108383 B1     5/2020

OTHER PUBLICATIONS

Kümmerle, Rainer, et al., "Autonomous Driving in a Multi-level Parking Structure", 2009 IEEE International Conference on Robotics and Automation, Kobe, Japan, May 12-17, 2009, 6 pages.

*Primary Examiner* — Joseph H Feild
*Assistant Examiner* — Pameshanand Mahase
(74) *Attorney, Agent, or Firm* — Slater Matsil, LLP

(57) ABSTRACT

A cognitive sensor-based autonomous parking route search system includes a cognitive sensor configured to obtain cognitive information for determining an existence and a location of an obstacle by sensing a space around a vehicle being driven in an inside of a parking lot, a global path search module configured to generate a global path for the inside of the parking lot as a node map by searching for a free space, in which the vehicle is capable of being driven, based on the cognitive information and by setting a node in the free space, and an optimal local path generation module configured to generate an optimal local path from a current location of the vehicle to a destination by connecting the node set in the free space while the vehicle moves inside the parking lot.

20 Claims, 11 Drawing Sheets

(51) Int. Cl.
*B60W 60/00* (2020.01)
*G06V 20/58* (2022.01)

(56) References Cited

U.S. PATENT DOCUMENTS

2021/0074159 A1\* 3/2021 Seo ........................ G06V 20/52
2021/0323537 A1\* 10/2021 Fan ........................ G08G 1/146

\* cited by examiner

▱ : Free Space
● : HP NODE
── : HP CONNECTION LINE
⊘ : VEHICLE DETECTION
⬬ : DETECTED VEHICLE COVARIANCE
⊙ : PEDESTRIAN DETECTION
⬭ : DETECTED VEHICLE COVARIANCE
─·─ : LP CONNECTION LINE
---- : PRINCIPAL COMPONENT ANALYSIS RESULT LINE
──▶ : VEHICLE WIDTH-BASED MOVABLE SPACE DETECTION LINE ◎ : VEHICLE DETECTION
⊙ : PEDESTRIAN DETECTION
● : PRINCIPAL COMPONENT ANALYSIS START POINT($x_{sp}, y_{sp}$)
---- : PRINCIPAL COMPONENT ANALYSIS RESULT LINE
⬭ : VEHICLE WIDTH-BASED MOVABLE SPACE DETECTION LINE ▨ : Free Space
● : HP NODE
— : HP CONNECTION LINE
◎ : VEHICLE DETECTION($x_o, y_o$)
⬭ : DETECTED VEHICLE COVARIANCE($\rho_o$)
⊙ : PEDESTRIAN DETECTION($x_o, y_o$)
⬭ : DETECTED VEHICLE COVARIANCE($\rho_o$)
—·— : LP CONNECTION LINE
---- : PRINCIPAL COMPONENT ANALYSIS RESULT LINE
→ : VEHICLE WIDTH-BASED MOVABLE SPACE DETECTION LINE ⬢ : Free Space
● : HP NODE
— : HP CONNECTION LINE
◎ : VEHICLE DETECTION($x_o, y_o$)
⬬ : DETECTED VEHICLE COVARIANCE($\rho_o$)
⊙ : PEDESTRIAN DETECTION($x_o, y_o$)
⬭ : DETECTED VEHICLE COVARIANCE($\rho_o$)
–·– : LP CONNECTION LINE
---- : PRINCIPAL COMPONENT ANALYSIS RESULT LINE
→ : VEHICLE WIDTH-BASED MOVABLE SPACE DETECTION LINE

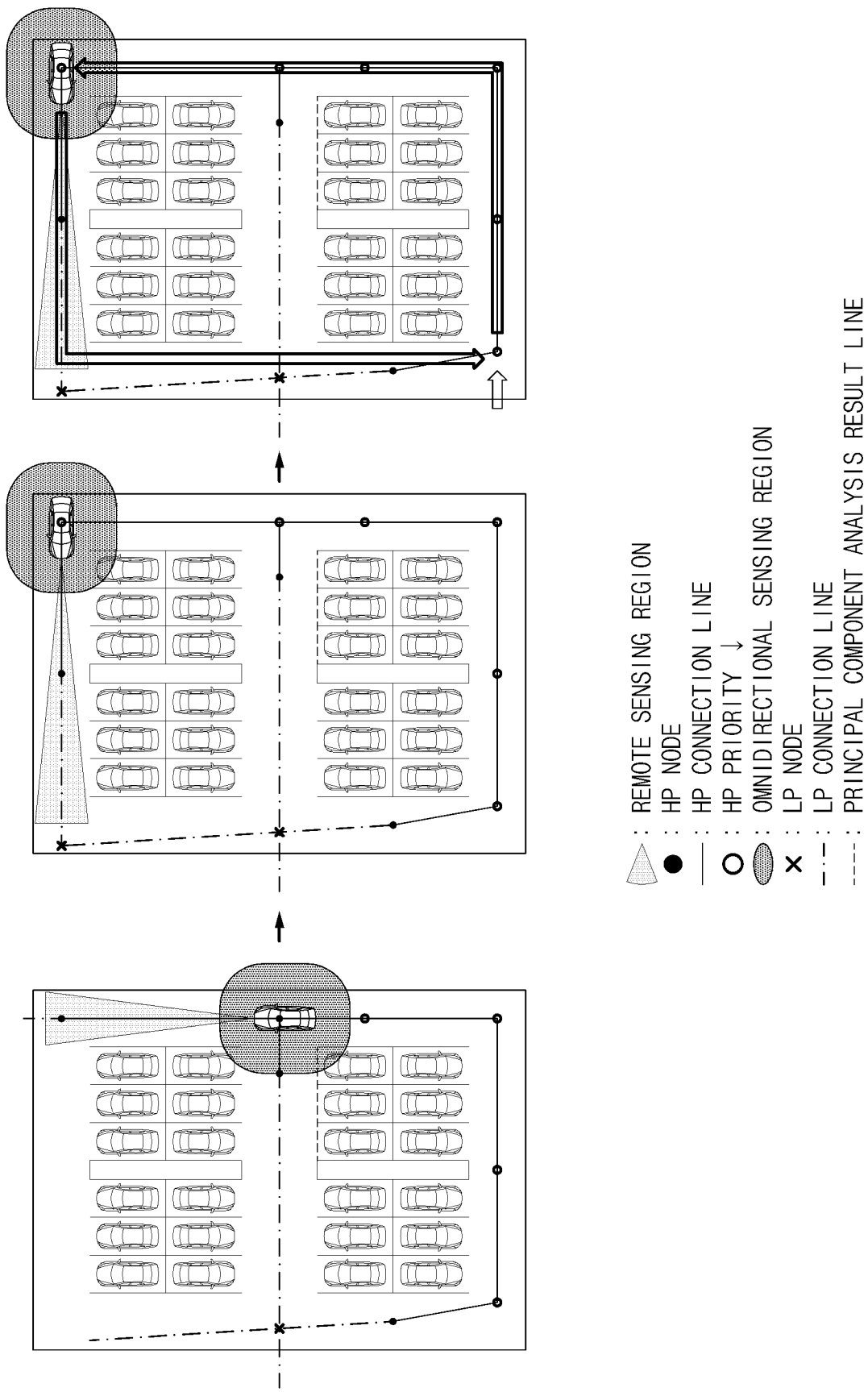

ROUTE SEARCH SYSTEM AND METHOD FOR AUTONOMOUS PARKING BASED ON COGNITIVE SENSOR

CROSS-REFERENCE TO RELATED APPLICATIONS

This application claims the benefit of Korean Patent Application No. 10-2020-0188348, filed in the Korean Intellectual Property Office on Dec. 30, 2020, which application is hereby incorporated herein by reference.

TECHNICAL FIELD

The present disclosure relates to a route search system and method for autonomous parking based on a cognitive sensor.

BACKGROUND

In general, a remote autonomous parking system may receive location information about an empty parking space in a parking lot from a server, may move a vehicle to the corresponding parking space without a user's intervention, and may perform autonomous parking.

A conventional remote autonomous parking system recognizes a path of a vehicle and the empty parking space based on infrastructure and markers, which are built in advance, inside the parking lot, and generates an appropriate path that directs the vehicle to the corresponding parking space so as to be parked.

Accurately, it is possible to perform autonomous parking in a parking lot that has the infrastructure for inducing autonomous parking and the marker for recognizing the location and path of the vehicle being driven. However, in a parking lot where the infrastructure and marker are not built, or in an underground space where data communication such as GPS transmission and reception is difficult, it is difficult to perform autonomous parking.

In other words, the conventional remote autonomous parking system is highly dependent on external factors of the vehicle, such as the infrastructure or external data communication environment built in the parking lot, not the vehicle itself. Accordingly, there are many restrictions in expanding the implementation area of autonomous parking.

SUMMARY

The present disclosure relates to a route search system and method for autonomous parking based on a cognitive sensor. Particular embodiments relate to a system and method for searching for an autonomous parking route based on a cognitive sensor that is capable of searching for an optimal path for finding an empty parking space.

Embodiments of the present disclosure can solve problems occurring in the prior art while advantages achieved by the prior art are maintained intact.

An embodiment of the present disclosure provides a system and method for searching for an autonomous parking route based on a cognitive sensor that includes a cognitive sensor that obtains cognitive information for determining the existence and location of an obstacle by detecting a space around a vehicle being driven inside a parking lot, a global path search module that generates a global path for the inside of the parking lot as a node map, for which nodes are set, by searching for a free space, in which the vehicle is capable of being driven, based on the cognitive information and setting nodes, and an optimal local path generation module that generates an optimal local path from a current location of the vehicle to a destination by connecting the nodes set in the free space while the vehicle moves inside the parking lot. The system and method for searching for an autonomous parking route based on a cognitive sensor may generate a global path within the parking lot based on cognitive information and may generate an optimal local path to perform autonomous parking, even in an environment where there is no infrastructure for supporting autonomous parking.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a cognitive sensor-based autonomous parking route search system includes a cognitive sensor that obtains cognitive information for determining existence and a location of an obstacle by sensing a space around a vehicle being driven in an inside of a parking lot, a global path search module that generates a global path for an inside of the parking lot as a node map by searching for a free space, in which the vehicle is capable of being driven, based on the cognitive information and setting a node, and an optimal local path generation module that generates an optimal local path from a current location of the vehicle to a destination by connecting the node set in the free space while the vehicle moves inside the parking lot.

Furthermore, the global path search module includes a cell setting device that determines whether the obstacle is recognized for each cell by dividing the space around the vehicle detected by the cognitive sensor into a plurality of cells, a free space search device that distinguishes between a parking space, in which the obstacle is detected, and a free space, in which the obstacle is not detected, based on the cognitive information, searches for a driving free space, which has a width at which the vehicle is capable of being driven, in the free space, and selects the driving free space as a part of the global path, and a HP node setting device that generates a HP node at an end of the driving free space, and sets the HP node for the driving free space on a parking lot map indicating the inside of the parking lot so as to be stored.

Moreover, the global path search module further includes a principal component analysis line generation device that generates a principal component indicating a distribution status of a covariance calculation region set depending on a detection location of the obstacle and generates a principal component analysis line indicating directivity of the covariance calculation region having a probability of detecting the obstacle having a specific level or more.

Also, the HP node setting device generates an HP connection line connecting a center of the vehicle to an HP node set in the driving free space so as to be stored.

Besides, the free space search device enhances a repulsive force potential field recognized in a space with the obstacle by generating a principal component analysis force potential field having a specific radius at a principal component analysis start point location when two or more free spaces having a travelable width are recognized.

In addition, the global path search module further includes an LP connection line generation device that generates an LP connection line parallel to the principal component analysis line with respect to a space after the HP node."

Furthermore, the global path search module further includes an LP node setting device that sets a point, at which the LP connection line contacts another connection line or another node, to an LP node.

Moreover, the optimal local path generation module includes a priority update device that lowers a priority of the HP node, through which the vehicle passes while being driven inside the parking lot, in inverse proportion to elapsed time and a local path generation device that generates a path from a current location of the vehicle to a destination based on a potential field and generates a path with a high priority of the HP node through which the vehicle passes to reach the destination, as a local path.

Also, the optimal local path generation module further includes a path generation condition determination device that causes a new local path to be generated when it is determined that all HP nodes are connected to two or more HP connection lines, by monitoring a connection line connected to the HP node.

Besides, the optimal local path generation module causes a new path passing through one or more LP nodes to be generated as an optimal path when a start node is capable of being reached by using a new path via the LP node other than a path on which the vehicle is moved while being driven.

According to an embodiment of the present disclosure, a method of searching for an autonomous parking route based on a cognitive sensor includes obtaining cognitive information for determining existence and a location of an obstacle by sensing a space around a vehicle being driven in an inside of a parking lot, generating a global path for an inside of the parking lot as a node map by searching for a free space, in which the vehicle is capable of being driven, based on the cognitive information and setting a node, and generating an optimal local path from a current location of the vehicle to a destination by connecting the node set in the free space while the vehicle moves inside the parking lot.

Furthermore, the generating of the global path includes dividing the space around the vehicle, distinguishing between a parking space, in which the obstacle is detected, and a free space, in which the obstacle is not detected, based on the cognitive information, searching for a driving free space, which has a width at which the vehicle is capable of being driven, in the free space, and selecting the driving free space as a part of the global path, and generating a HP node at an end of the driving free space, and setting the HP node for the driving free space on a parking lot map indicating the inside of the parking lot so as to be stored.

Moreover, the generating of the global path further includes generating a principal component indicating a distribution status of a covariance calculation region set depending on a detection location of the obstacle and generating a principal component analysis line indicating directivity of the covariance calculation region having a probability of detecting the obstacle having a specific level or more.

Also, the searching for the driving free space includes enhancing a repulsive force potential field recognized in a space with the obstacle by generating a principal component analysis force potential field having a specific radius at a principal component analysis start point location when two or more free spaces having a travelable width are recognized.

Besides, the generating of the global path further includes generating an LP connection line parallel to the principal component analysis line with respect to a space after the HP node.

In addition, the generating of the global path further includes setting a point, at which the LP connection line contacts another connection line or another node, to an LP node.

Furthermore, the generating of the optimal local path includes lowering a priority of the HP node, through which the vehicle passes while being driven inside the parking lot, in inverse proportion to elapsed time and generating a path from a current location of the vehicle to a destination based on a potential field and generating a path with a high priority of the HP node through which the vehicle passes to reach the destination, as a local path.

Moreover, the generating of the optimal local path further includes causing a new local path to be generated when it is determined that all HP nodes are connected to two or more HP connection lines, by monitoring a connection line connected to the HP node.

BRIEF DESCRIPTION OF THE DRAWINGS

The above and other objects, features and advantages of embodiments of the present disclosure will be more apparent from the following detailed description taken in conjunction with the accompanying drawings, in which:

FIGS. 7A and 7B are exemplary diagrams illustrating that a node-based parking path map is generated by directly searching a parking path of a parking lot based on cognitive information of a cognitive sensor, according to an embodiment of the present disclosure;

DETAILED DESCRIPTION OF ILLUSTRATIVE EMBODIMENTS

Figure 1:
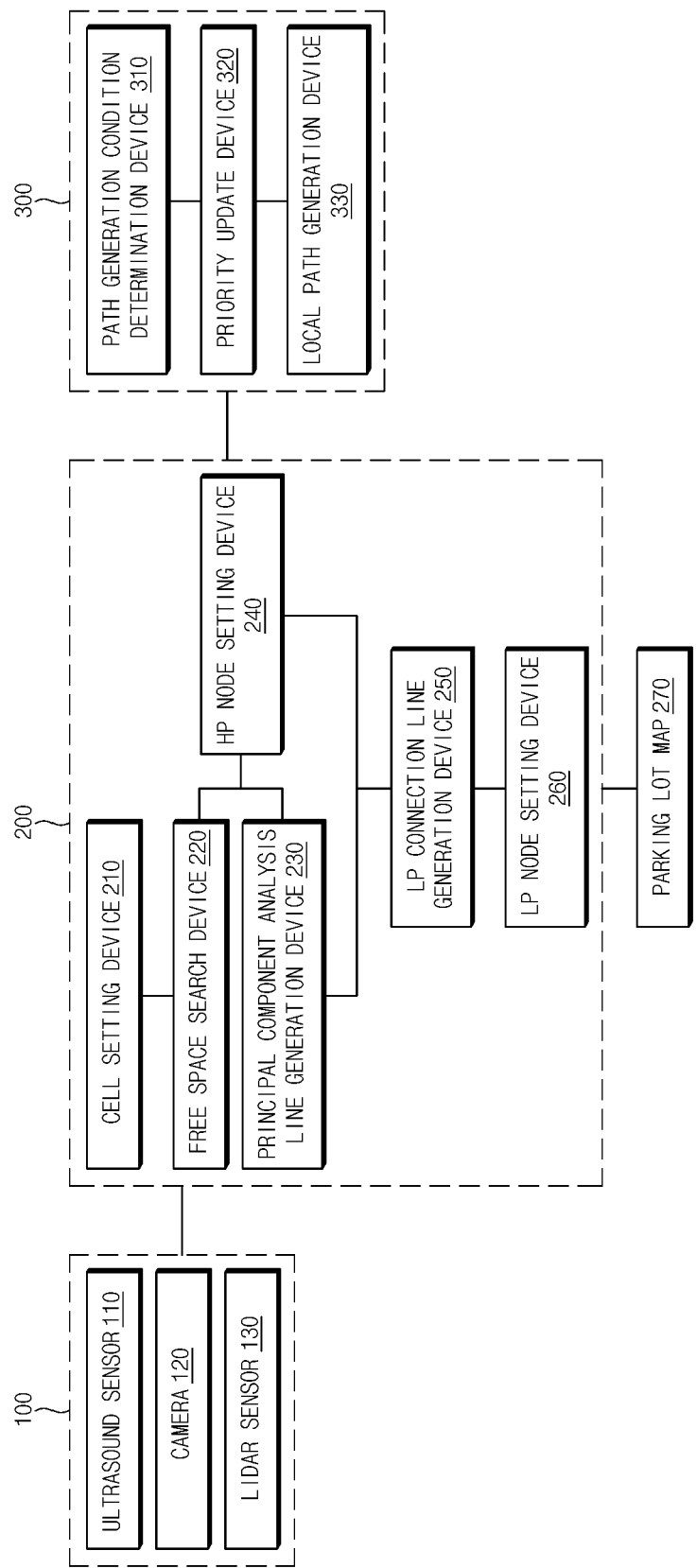
FIG. 1 is a block diagram of a cognitive sensor-based autonomous parking route search system, according to an embodiment of the present disclosure.

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 10.

FIG. 1 is a block diagram of a cognitive sensor-based autonomous parking route search system, according to an embodiment of the present disclosure.

Referring to FIG. 1, a cognitive sensor-based autonomous parking route search system according to an embodiment of the present disclosure may include a cognitive sensor 100, a global path search module 200, and an optimal local path generation module 300. The cognitive sensor 100 may obtain cognitive information for determining the existence and location of an obstacle by detecting a space around a vehicle being driven inside a parking lot. The global path search module 200 may generate a global path for the inside of the parking lot as a map (hereinafter referred to as a "node map"), for which nodes are set, by searching for a free space, in which the vehicle is capable of being driven, based on the cognitive information and setting nodes. The optimal local path generation module 300 may generate an optimal local path from a current location of the vehicle to a destination by connecting the nodes set in the free space while the vehicle moves inside the parking lot.

The cognitive sensor 100 includes a sensor capable of obtaining cognitive information for sensing the space around the vehicle, so as to identify and recognize the free space, in which the vehicle is capable of being driven, and a parking space, in which the driving of the vehicle is restricted, in the interior space of the parking lot.

The cognitive sensor 100 may include an ultrasound sensor no, a camera 120, and a LiDAR sensor 130, which are already installed in a vehicle, so as to obtain information about obstacles around the vehicle for autonomous driving. At this time, the cognitive information obtained as the obstacle information may include a parking line, a marker, or a curb on a road surface, which is capable of identifying the parking space, in addition to a location of the parked vehicle.

The ultrasound sensor no may obtain, as the cognitive information, sensing data for detecting an obstacle in a short distance around the vehicle based on the time-of-flight (TOF) and direction of an ultrasonic wave that is returned after reflecting the obstacle. At this time, the ultrasound sensor no may include a plurality of ultrasound sensors that are respectively installed on a front, rear, left, and right sides of the vehicle, so as to determine whether there are obstacles in each direction around the vehicle.

Furthermore, the camera 120 may obtain, as the cognitive information, image data for determining information about the existence of an obstacle and a direction, in which the obstacle is positioned, by capturing the front, rear, left, and right sides of the vehicle. To this end, the camera 120 may include omnidirectional cameras that are installed on the front, rear, left, and right sides of the vehicle.

Moreover, the LiDAR sensor 130 may obtain a distance to an obstacle, a direction of the obstacle, or the like as the cognitive information by measuring the intensity of a pulsed laser and the time required to return after the pulsed laser is emitted and then is reflected from the obstacle. A range in which a free space where the vehicle is being driven is found may be expanded because the LiDAR sensor 130 is capable of detecting the existence and distance of an obstacle that is at a long distance.

Also, the global path search module 200 may include a cell setting device 210, a free space search device 220, and a HP node setting device 240. The cell setting device 210 may determine whether an obstacle is recognized for each cell, by dividing the space around the vehicle detected by the cognitive sensor into a plurality of cells. The free space search device 220 may distinguish between a parking space, in which the obstacle is detected, and a free space, in which the obstacle is not detected, based on the cognitive information, may search for a driving free space, which has a width at which the vehicle is capable of being driven, in the free space, and may select the driving free space as a part of a global path. The HP node setting device 240 may generate a high-priority (HP) node at an end of the driving free space, and may set nodes for the driving free space on a parking lot map indicating the inside of the parking lot so as to be stored.

Figure 3:
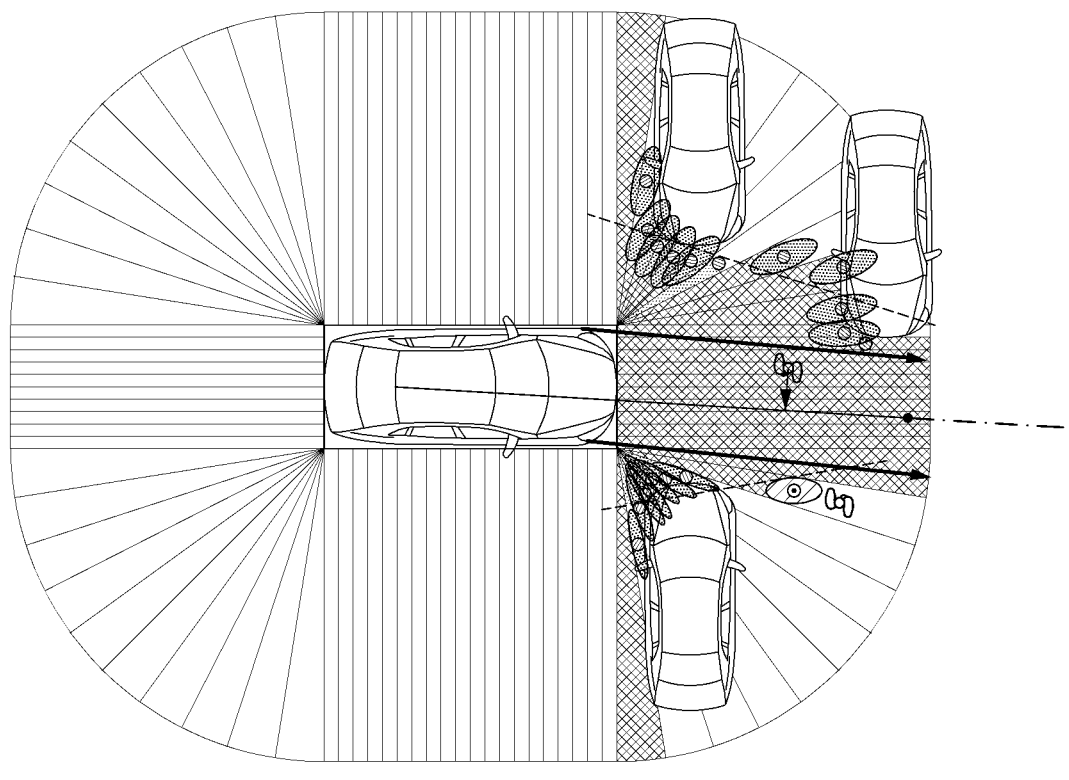
FIG. 3 is an exemplary view illustrating a method for detecting a free space and generating a node, according to an embodiment of the present disclosure.
Figure 3:
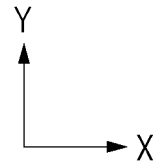

As shown in FIG. 3, the cell setting device 210 may divide the space around the vehicle, in which an obstacle is capable of being recognized, into a plurality of cells and may set location information including a unique number of a cell in each divided cell. Accordingly, it is possible to determine whether an obstacle is present in the space around the vehicle, in units of cells, and thus the determination may be performed more conveniently.

At this time, as shown in FIG. 3, the cell setting device 210 divides a region at a periphery of a vehicle into 100 cells. Each of the front region and rear region of the vehicle is divided into 10 cells that are parallel to the longitudinal direction of the vehicle. Each of the left-side and right-side regions of the vehicle is divided into 20 cells that are parallel to the width direction of the vehicle. Each of the four corner regions of the vehicle is divided into 10 cells formed radially around each corner of the vehicle. This cell division in FIG. 3 is only an example. For example, the number of cells and shapes of the divided cells may be set differently.

The cell setting device 210 may respectively assign unique numbers, such as cell 1 to cell 100, to the divided cells and may store the location information of each cell together. Accordingly, the cell setting device 210 may conveniently extract the unique number of a cell where the obstacle is detected based on the cognitive information and may conveniently determine the location of the obstacle. At this time, the location information of each cell may be set to a coordinate value on a local coordinate system (illustrated in an X-Y coordinate system in FIG. 3) based on the center of the vehicle.

Furthermore, the free space search device 220 may identify and recognize the parking space where the obstacle is detected and the free space where the obstacle is not detected, based on the cognitive information. At this time, as shown in FIG. 3, the free space search device 220 determines whether an obstacle is detected for each divided cell. The free space search device 220 may determine that a cell (in FIG. 3, a significant portion of a front region of the vehicle and some regions of a right corner cell of the vehicle), in which no obstacle is detected, is a free space and may also determine that a region up to a location where the obstacle is detected is a free space, even in a region where the obstacle is detected.

Also, the free space search device 220 may select a free space, in which the lateral distance of the free space is wider than the width of the vehicle, as a driving free space in which a vehicle is capable of moving to search for a global path.

The free space search device 220 may be provided to search for the driving free path that constitutes a global path in which a vehicle is capable of moving within a parking lot. The free space search device 220 may determine whether an obstacle is detected, by targeting the front portion of the vehicle in the traveling direction, and then may recognize the free space.

At this time, the free space search device 220 may set an obstacle detection point at a location where the obstacle is detected in a cell determined to have an obstacle, and may set the obstacle detection region of a cell including the obstacle detection point as a covariance calculation region.

Accordingly, as shown in FIG. 3, the obstacle detection point (shown as a circle filled with slashes inside the circle) and the covariance calculation region (shown as a shaded ellipse) may be set in a region between an obstacle and the vehicle in a cell where the obstacle is detected.

In FIG. 3, it is indicated that a pedestrian walking inside the parking lot as well as a vehicle parked in the parking space is recognized as an obstacle detected based on cognitive information.

At this time, even when a result of searching for a space around the vehicle by the cognitive sensor indicates that a moving object such as a pedestrian is detected, the free space search device 220 may ignore the moving object and may recognize the space as a free space when determining whether there is a free space.

Also, in FIG. 3, it is indicated that a pedestrian detection point (illustrated with a circle having a dot in the circle) is set for a cell where a pedestrian is detected, and the pedestrian detection region of the corresponding cell including the pedestrian detection point is set for a covariance calculation region for a pedestrian.

Besides, when an obstacle such as a parking line, a marker, or a curb is not detected in a case of an empty lot, every space may be recognized as the free space. Accordingly, it may be difficult to set up a criterion for searching for a parking path for performing autonomous parking.

Accordingly, while the vehicle maintains the single directivity of either keeping the right (Right Hand Based) or keeping the left (Left Hand Based), and is driving at a corner, the free space search device 220 may search for a free space.

In other words, when all spaces around the vehicle are recognized as a free space based on the cognitive information obtained by the cognitive sensor 100, the vehicle may be parked first from a place close to the corner. Accordingly, the criterion for a following vehicle to search for a parking path and to find a parking space may be provided.

Also, the global path search module 200 may further include a principal component analysis line generation device 230. The principal component analysis line generation device 230 may generate a principal component indicating the distribution status of a covariance calculation region set depending on the detection location of an obstacle and may generate a principal component analysis line indicating the directivity of the covariance calculation region having a probability of detecting the obstacle having a specific level or more. Accordingly, the free space search device 220 may set the principal component analysis line to a guide and then may set the outer region of the guide to a driving free space in which the vehicle is capable of being driven.

The covariance calculation region may indicate the distribution of obstacles in each cell. On the other hand, the principal component analysis line may indicate a direction with high probability of detecting obstacles throughout a plurality of cells by reducing variables based on a result of analyzing the principal component.

Figure 4:
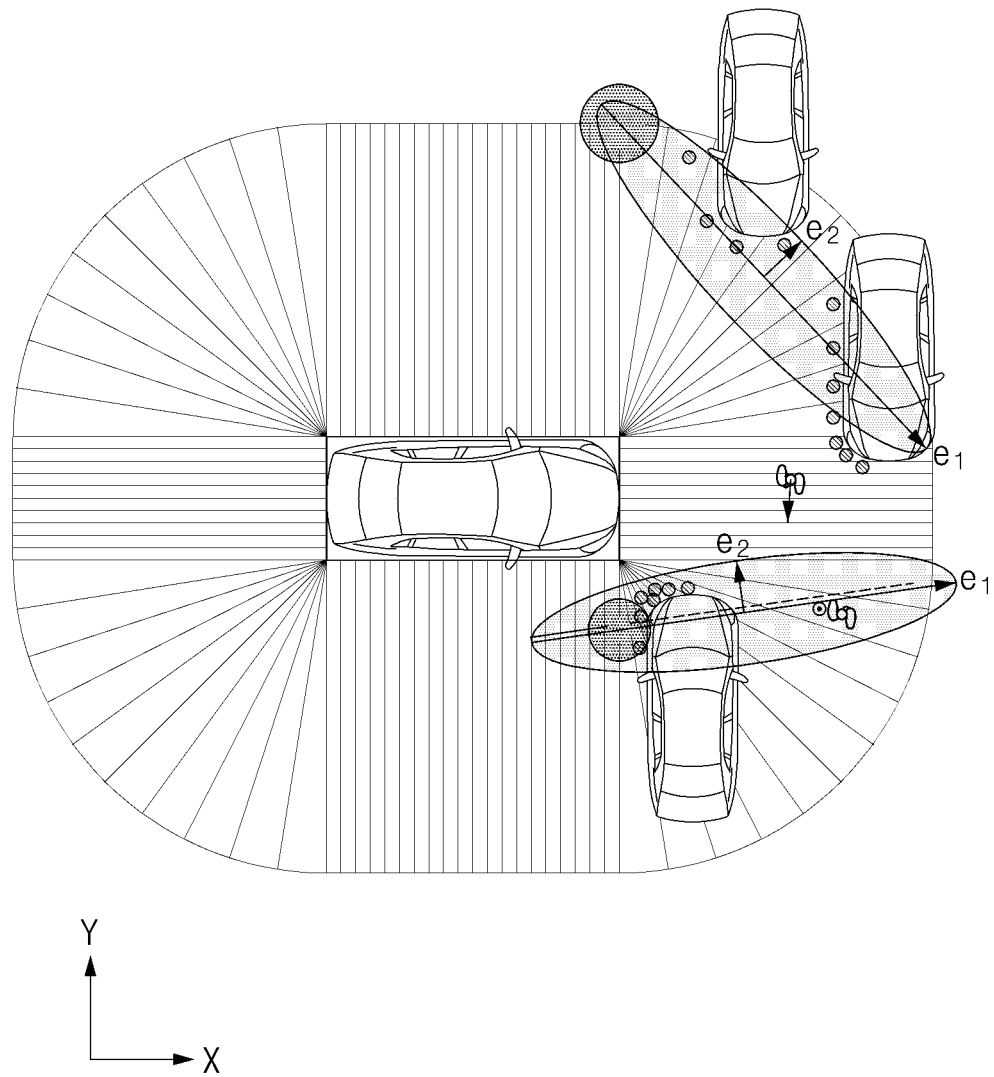
FIG. 4 is an exemplary view illustrating that a principal component analysis line is generated, according to an embodiment of the present disclosure.

As shown in FIG. 4, the principal component analysis line generation device 230 may set vehicle detection coordinates (x, y), at which the vehicle is detected based on the cognitive information, to variables x1 and x2 and then may perform principal component analysis according to Equation 1 as follows. Accordingly, the principal component analysis line generation device 230 may derive a principal component analysis line as an eigenvector ($e_1$) indicating the directivity of a region in which the probability of detecting an obstacle is not less than a specific level.

Equation 1

$$\frac{x_1 - m_1}{a} = \frac{x_2 - m_2}{b} = \ldots = \frac{x_n - m_n}{c} \quad (1)$$

$$C = E[(x - m_x)(x - m_x)^T] \quad (2)$$

$$C_{ij} = E[(x_i - m_i)(x_j - m_j)^T] \quad (3)$$

$$C = \begin{pmatrix} C_{11} & \cdots & C_{1n} \\ \vdots & \ddots & \vdots \\ C_{n1} & \cdots & C_{nn} \end{pmatrix} \quad (4)$$

$$C = (e_1 \ldots e_n) \begin{pmatrix} \lambda_1 & \cdots & 0 \\ \vdots & \ddots & \vdots \\ 0 & \cdots & \lambda_n \end{pmatrix} \begin{pmatrix} e_1 \\ \vdots \\ e_n \end{pmatrix} \quad (5)$$

$$C \cdot e_i = \lambda_i \cdot e_i \quad (6)$$

At this time, in Equation 1, 'x' denotes vehicle detection coordinates at which an obstacle is detected based on the cognitive information; 'm' denotes an average of the vehicle detection coordinates, that is data for deriving a principal component; "x=[$x_1, \ldots x_n$]" denotes the n-dimensional vector expression of the vehicle detection coordinates; and, "m=[$m_1, \ldots m_n$]" denotes the n-dimensional vector expression of an average of the vehicle detection coordinates. Hereinafter, the embossed character denotes an n-dimensional vector expression. Besides, $e_i$ denotes an eigenvector indicating the direction of a variance of a covariance matrix (C); and, $\lambda_i$ denotes an eigenvalue that is the covariance in direction $e_i$. Also, $e_i$ indicates an eigenvector having the largest eigenvalue; and, $e_2$ indicates a vector perpendicular to $e_1$.

The principal component analysis line generation device 230 may linearly approximate the extent to which respective vehicle detection coordinates are spaced from the average through (i) of Equation 1, may calculate the average of squares of values, which are linearly approximated in (i) of Equation 1, by using the transposition matrix through (2) of Equation 1, and may calculate the covariance matrix (C)

composed of an n-dimensional square matrix. At this time, the exponent ($C_{ij}$) of the covariance matrix may be defined as shown in (3) of Equation 1.

As such, the calculated covariance matrix (C) may be expressed as a "Real and Symmetric Matrix" as shown in (4) of Equation 1. And, the covariance matrix may include an eigenvector component ($e_i$) and an eigenvalue component ($\lambda_i$) as shown in (5) and (6) of Equation 1.

At this time, as illustrated in FIG. 4, the principal component analysis line generation device 230 may generate principal component analysis lines with respect to the front left and right sides of the vehicle at which an obstacle is detected, respectively. As such, when the two principal component analysis lines are generated, an angle corresponding to the average of the two principal component analysis lines may be determined as a final direction of the principal component analysis line. The final direction of the principal component analysis line may be provided as a reference direction in which the LP connection line is generated later.

Furthermore, the HP node setting device 240 may set a HP node, to which a high priority is assigned to the farthest point where an obstacle is not recognized in a driving free space selected by the free space search device 220, so as to be stored. At this time, the high priority means that there is a high need for the vehicle to pass through the HP node when a vehicle moves from a current location to the next location.

Figure 2:
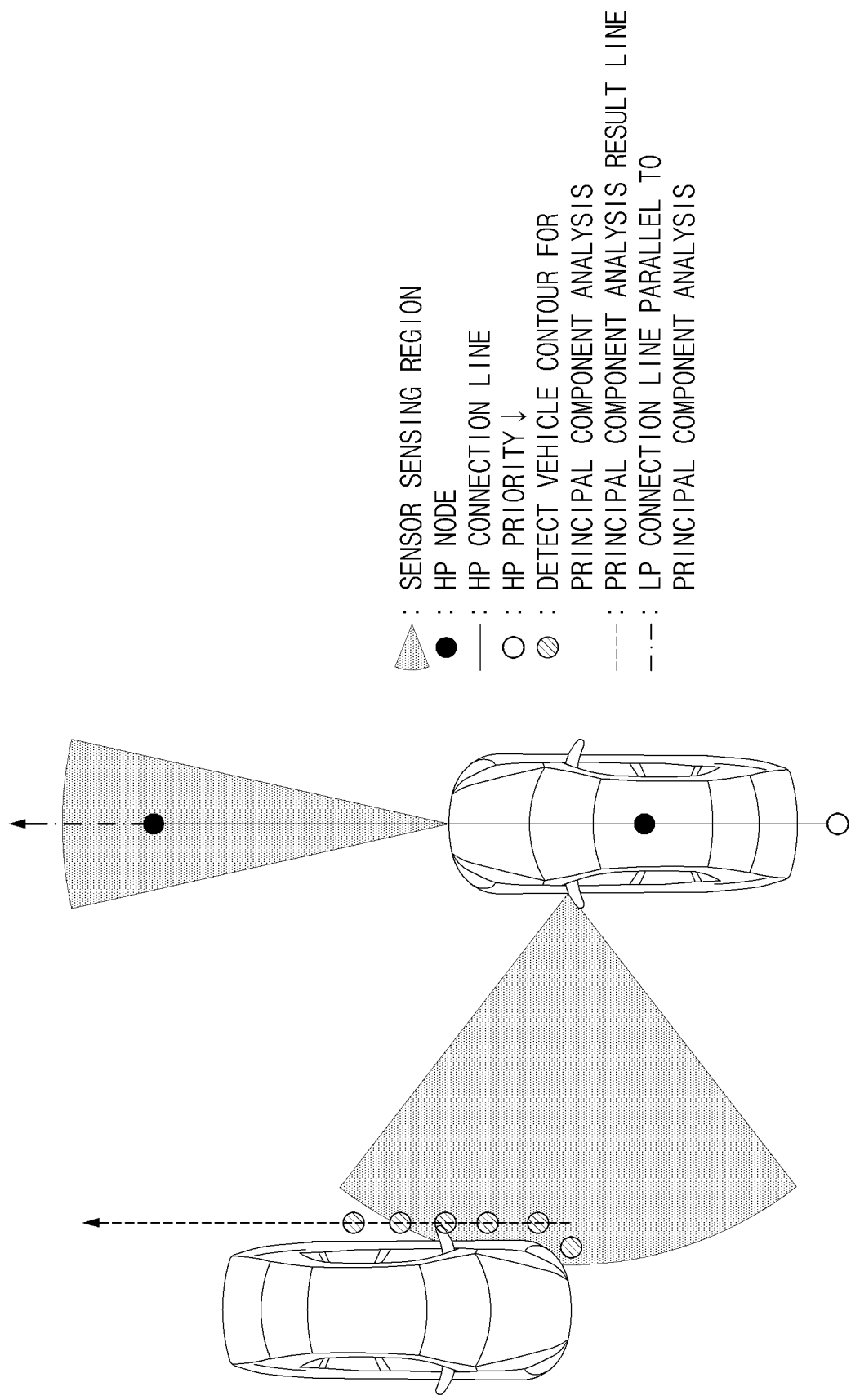
FIG. 2 is an exemplary view illustrating that a node is generated through principal component analysis, according to an embodiment of the present disclosure.

Moreover, as illustrated in FIG. 2, the HP node setting device 240 may generate an HP connection line connecting the center of the vehicle to the HP node set in the driving free space so as to be stored.

As such, the HP node thus generated may indicate a point where the vehicle is capable of moving without being obstructed by obstacles such as vehicles parked in the driving free space. The HP connection line may provide a driving route from the vehicle's current location to the HP node.

As such, the HP connection line connecting the HP nodes may form a driving route on which the vehicle moves in the parking lot, and thus may form a part of the global path that is a path on which the vehicle is driven on the entire parking lot.

Figure 5:
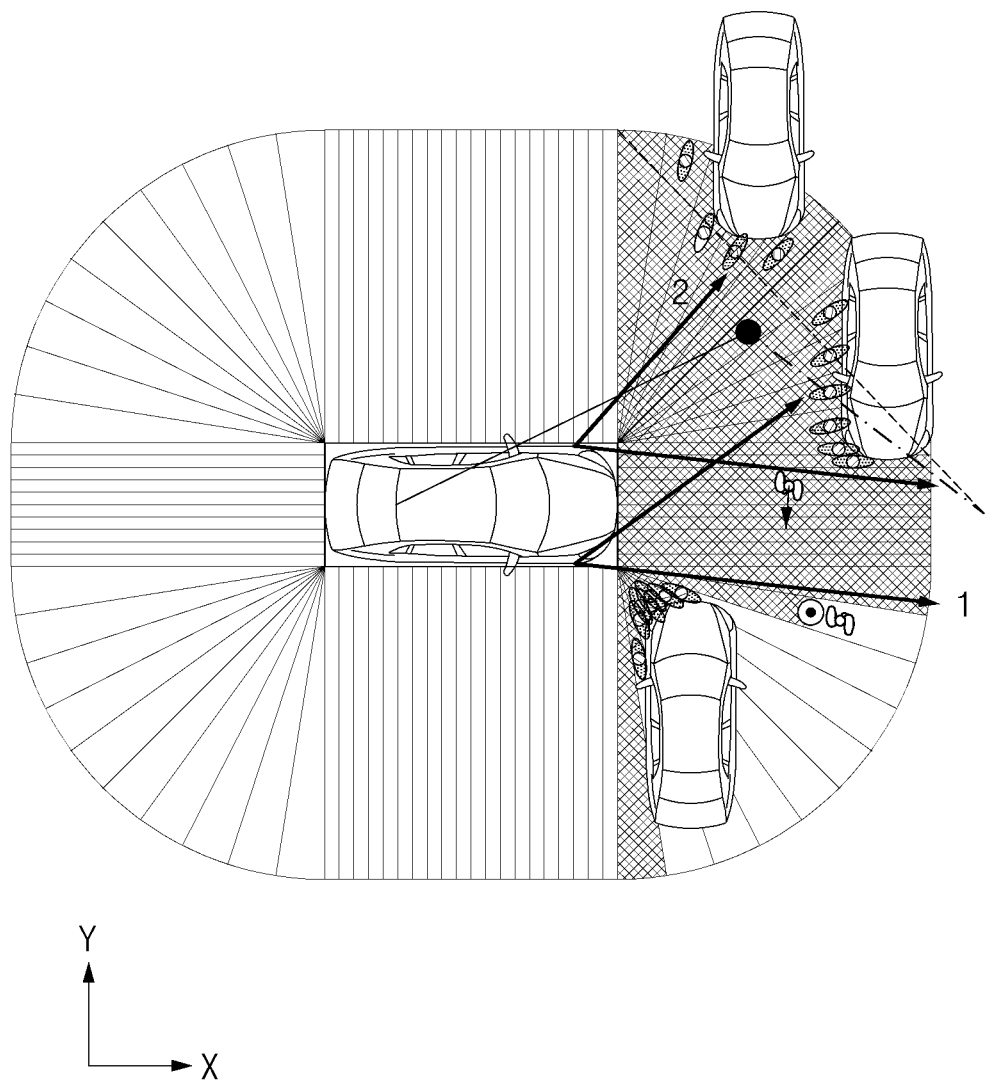
FIG. 5 is an exemplary view illustrating an example in which a path is lost when a free space based on a potential field is detected.

However, unlike a case where only one free space is detected as illustrated in FIG. 3, when two or more free spaces are detected as shown in FIG. 5, there is a need to determine which free space is selected as a driving free space.

In an example illustrated in FIG. 5, a first free space (No. 1) and a second free space (No. 2) are detected. Both the free spaces provide a lateral interval wider than a width of the vehicle. However, when an optimal path is generated by a potential field-based algorithm adopted by the optimal local path generation module 300, the second free space (No. 2) that provides a wider free space may be selected as the driving free space by the influence of a repulsive force potential field provided by a nearby obstacle.

The optimal path is generated by the potential field-based algorithm. In this case, when there is no attractive force potential field for inducing the approach to a destination, the vehicle is only affected by the repulsive force potential field, which causes the vehicle to move away from adjacent obstacles.

The global path search module 200 may generate a parking lot map by searching for the optimized global path for moving a vehicle inside a parking lot to find an empty parking space. The optimal local path generation module 300 may generate an optimal local path for finding and moving to an empty parking area at a current location. Accordingly, it is difficult to have the attractive force potential field capable of inducing the approach of the vehicle.

Accordingly, as shown in FIG. 5, when a plurality of free spaces are detected, and when a HP node is set in a wide free space by providing the wide free space in one free space, a local minimum situation may occur while other directivity is not found when the corresponding HP node is reached.

Also, to solve the local minimum situation, a path on which the vehicle returns to an original driving route after passing through the HP node set at a location, which is out of the optimal driving route, is generated, and thus a path loss may occur.

Accordingly, when a plurality of free spaces are detected, the free space search device 220 may preferably set the HP node by selecting a free space capable of generating an optimal local path in the optimal local path generation module 230 as the driving free space.

Figure 6:
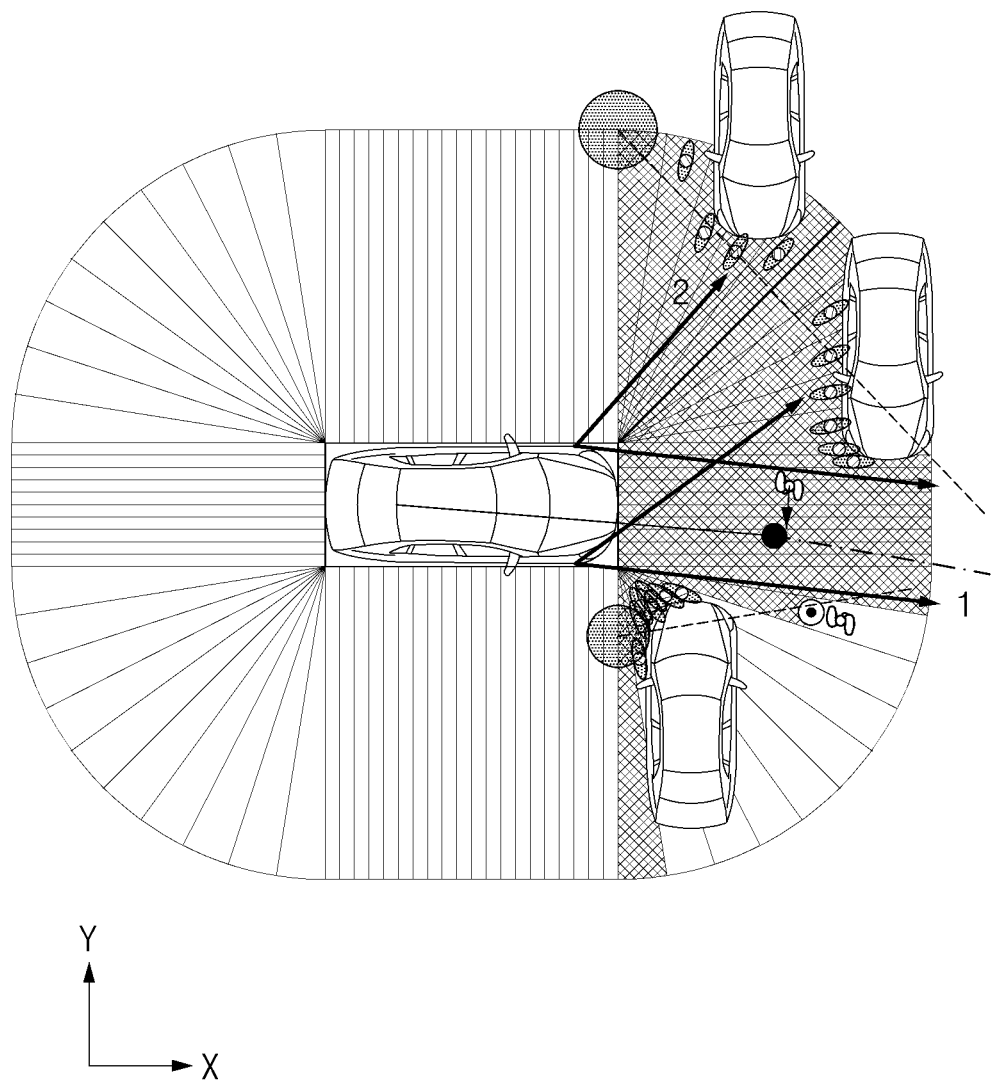
FIG. 6 is an exemplary view illustrating that a driving free space is recognized by additionally generating an obstacle potential field, according to an embodiment of the present disclosure.

To the end, as shown in FIG. 6, when two or more free spaces having a travelable width are recognized, the free space search device 220 may enhance the repulsive force potential field recognized in a space with an obstacle by generating a principal component analysis force potential field having a specific radius at a principal component analysis start point location.

In other words, when it is recognized that there is an obstacle on both sides of the front of a vehicle while the vehicle is moved by autonomous driving, the vehicle maintains a current driving direction rather than a direction where the obstacle is present, and thus the space with obstacles may be recognized by generating a principal component analysis force potential field at the start point location of the principal component analysis.

At this time, when a lot of obstacles are detected in a front location close to a current location of the vehicle, which corresponds to the number of a cell at which an obstacle is detected based on the cognitive information, the free space search device 220 may set a radius of the start point of the principal component analysis to be narrow; and, when the number of the cell where an obstacle is detected corresponds to the rear location, the free space search device 220 may set a radius of the principal component analysis start point to be large.

Accordingly, a principal component analysis force potential field with a small radius may be generated when a lot of obstacles are detected at the front location of the cell. For the purpose of avoiding the obstacles, the driving free space may be selected such that the vehicle moves to the side or turns to the left or right. When a lot of obstacles are detected at the location behind the cell, a principal component analysis start point with a large radius may act as a principal component analysis force potential field for preventing the approach of a vehicle. Accordingly, the local minimum situation may be prevented.

To the end, as shown in Equation 2 below, although the principal component analysis force potential field is considered together when a potential field-based algorithm is implemented, it may be determined whether the space is capable of being selected as a driving free space.

Equation 2

$$d_o = \sqrt{(x - x_o^s - \rho_{o_x}^s)^2 + (y - y_o^s - \rho_{o_y}^s)^2} \quad (1)$$

-continued
$$\rho_o = MUCMKF(x_o^s, y_o^s) \quad (2)$$

$$F_{REF} = (K_{REF} - d_o) \cdot \left( \frac{x - x_o^s - \rho_{ox}^s}{d_o} i + \frac{y + y_o^s - \rho_{oy}^s}{d_o} j \right) \quad (3)$$

$$d_{sp} = \sqrt{(x - x_{sp})^2 + (y - y_{sp})^2} \quad (4)$$

$$F_{pCA} = (K_{sp} - d_{sp}) \cdot \left( \frac{x - x_{sp}}{d_{sp}} i + \frac{y - y_{sp}}{d_{sp}} j \right) \cdot \left( \sum_{l=1}^{N} \frac{l}{2N+1} \right) \quad (5)$$

$$F = F_{pCA} + F_{REF} \quad (6)$$

At this time, in a variable expression of Equation 2, a superscript denotes a sensor (s) used to detect an obstacle, and a subscript denotes the detected obstacle (o). Accordingly, $x_o^s$ and $y_o^2$ denote coordinates of a location where an obstacle is detected by a sensor on a local coordinate system centered on a vehicle. $\rho_{o_x}$ and $\rho_{o_y}$ denote covariance on the x-axis and y-axis of the obstacle.

Moreover, in (5) of Equation 2 for calculating a principal component analysis force potential field ($F_{PCA}$) generated at the principal component analysis start point, it is indicated that the principal component analysis force potential field ($F_{PCA}$) is calculated considering that both "l=1" and N are affected from a location close to a map to a location close to the vehicle.

Also, in (3) and (6) in Equation 2, $F_{REP}$ denotes a repulsive force potential field, and $F_{PCA}$ denotes a principal component analysis force potential field. Besides, in (3) and (5) in Equation 2, $K_{REP}$ denotes a constant value in the repulsive force potential field, and $K_{SP}$ denotes a constant value at the principal component analysis force potential field start point (SP).

The sum of the principal component analysis force potential field ($F_{PCA}$) generated at the principal component analysis start point and the repulsive force potential field ($F_{REP}$) generated by the obstacle actually detected by using the cognitive information according to Equation 2 may be the total potential field that acts when a path is generated based on the potential field in a vehicle.

Accordingly, when two or more free spaces with a travelable width are recognized, the free space search device 220 may search for a local minimum indicating a local minimum value in the entire potential field (F) calculated by Equation 2 and may select a driving free space by determining whether a space where a vehicle is capable of moving is secured around the local minimum.

For this reason, in FIG. 5, the second free space (No. 2) is selected as the driving route based on only the location of an obstacle detected without considering the principal component analysis start point potential field ($F_{PCA}$). On the other hand, in FIG. 6, the second free space (No. 2) is reduced while overlapping with a potential field at the principal component analysis start point. As a result, it is difficult to secure a space in the second free space (No. 2) to the extent to which a vehicle is capable of further moving, and thus the first free space (No. 1) is selected as the driving route.

The free space search device 220 may select the first free space (No. 1) thus selected as a driving free space. Accordingly, the HP node setting device 240 may set an HP node for inducing the movement of the vehicle in the driving free space so as to be stored in a parking lot map 270.

Furthermore, the global path search module 200 may further include a low-priority (LP) connection line generation device 250 that generates an LP connection line parallel to the principal component analysis line with respect to a space after the HP node.

That is, the LP connection line may be used to present a criterion for a driving route after the HP node so as to be parallel to the principal component analysis line, and may provide a guide for generating a path by a potential field-based algorithm in the optimal local path generation module 300.

At this time, as illustrated in FIG. 6, when two principal component analysis lines are generated on both sides of the front of a vehicle, the LP connection line may be set as the average of angles formed between the two principal component analysis lines.

Furthermore, the global path search module 200 may further include an LP node setting device 260 that sets a point, at which the LP connection line contacts another connection line or node, to an LP node.

That is, unlike the HP node set within a range capable of being directly detected by a cognitive sensor provided in a vehicle, the LP node is set at a point, at which an LP connection line generated for a region out of a detection range of the cognitive sensor is connected to another connection line or node.

Accordingly, it is possible to set an LP node capable of being used to generate a local path even in a region in which a vehicle is not directly driven or an undetected region. For this reason, although a vehicle is not driven in all the spaces within the parking lot, a global path for the parking lot may be generated based on a HP connection line and an LP connection line that connect the HP node and the LP node.

Also, when there are three or more HP connection lines or LP connection lines that are connected to the HP node, there are three or more driving free spaces for reaching the corresponding HP node, and thus a space for which the corresponding HP node is set may be determined as a three-way intersection or a crossroad so as to be stored in the parking lot map 270.

Furthermore, the optimal local path generation module 300 may include a path generation condition determination device 310, a priority update device 320, and a local path generation device 330. The path generation condition determination device 310 may monitor a connection line connected to the HP node. When it is determined that all HP nodes are connected to two or more HP connection lines, the path generation condition determination device 310 may allow a new local path to be generated. The priority update device 320 may lower the priority of the HP node, through which a vehicle passes while being driven inside the parking lot, in inverse proportion to the elapsed time. The local path generation device 330 may generate a path from a current location of the vehicle to a destination based on a potential field, and may generate a path with a high priority of the HP node, through which the vehicle passes to reach the destination, as a local path.

When it is determined that two or more HP connection lines are connected to all HP nodes generated based on the sensing information obtained in driving inside the parking lot, the path generation condition determination device 310 may control the generation of a new local path capable of reaching the destination without returning to the passed path.

That is, unlike the LP node, which is set for an unknown region that has not been within the detection range of a vehicle, the space for which the HP node is set has been within the detection range of the vehicle. The HP connection line indicates the drivable space identified as safe driving is possible, by connecting the vehicle to the HP node.

Accordingly, two or more HP connection lines are connected to all HP nodes generated based on sensing information obtained in driving in a parking lot. After a path for accessing the HP node and a path for departing from the HP node are secured clearly, the path generation condition determination device 310 may generate a new local path capable of moving to a desired destination within the parking lot.

Furthermore, as shown in the third diagram of FIG. 7B, the optimal local path generation module 300 may generate a new path passing through one or more LP nodes as an optimal path when a start node is capable of being reached by using the new path via an LP node in addition to a path on which the vehicle is moved while being driven.

As such, generating a path on which a vehicle returns to the start node via the LP node as an optimal path may be a part of a search process for generating a global path in a parking lot, not generating a local path for reaching a specific destination. Accordingly, two or more HP connection lines may not be connected to all HP nodes.

Figure 7A:
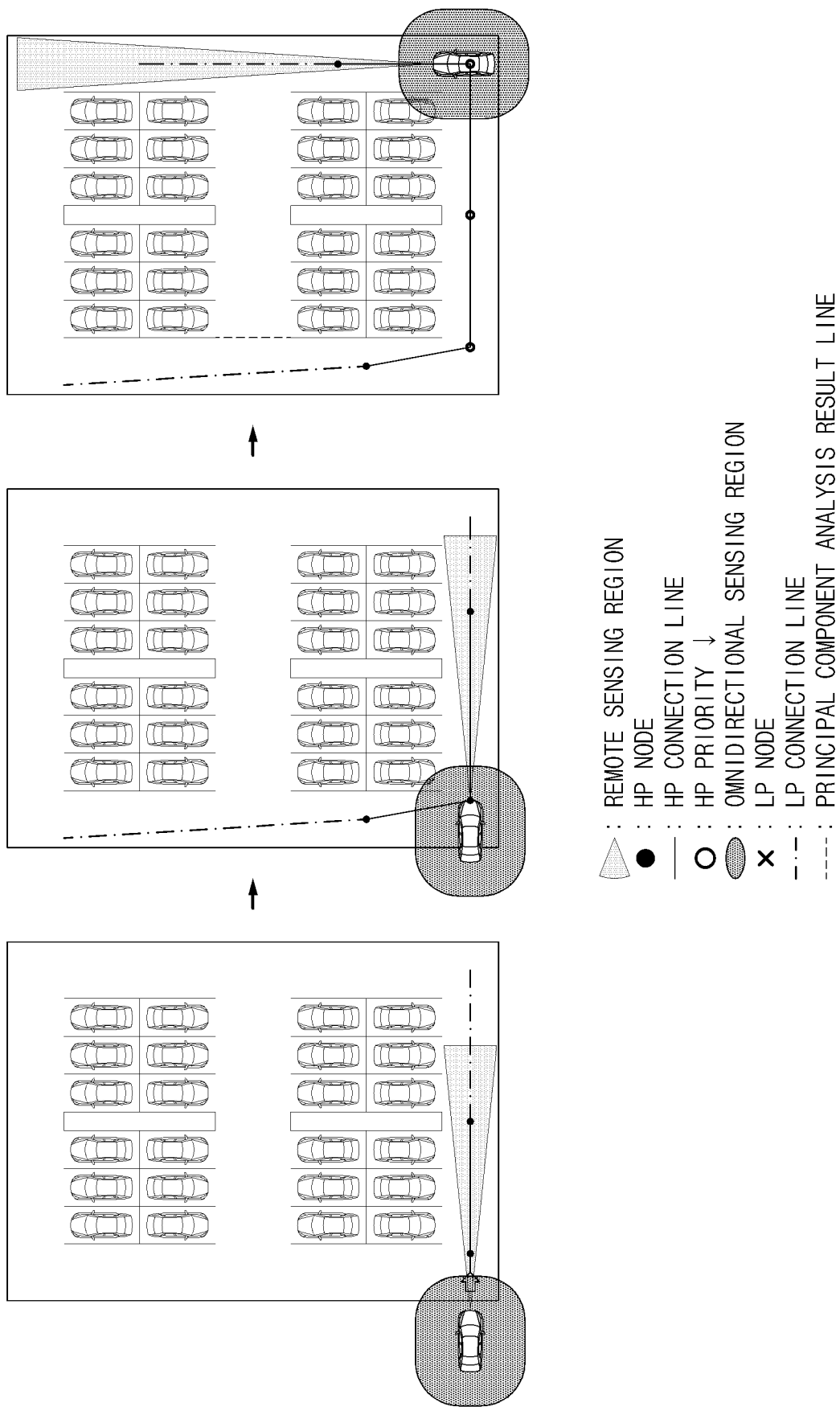

That is, as shown in FIGS. 7A and 7B, when the internal structure of a parking lot is a symmetrical circulation structure, there is a high possibility that the LP node generated for an unknown region is to be converted to the HP node, through which a vehicle being driven passes.

Accordingly, as shown in the middle diagram of FIG. 7B, when LP connection lines are in contact with one another so as to generate an LP node, the LP node indicates that different LP connection lines extending from different HP nodes meet each other. Accordingly, when a vehicle is driven along the LP connection line to pass through the LP node, a global path that meets another HP node may be generated.

The priority update device 320 may be configured to update a priority of the HP node, through which the vehicle driven inside the parking lot preferentially passes rather than other places, in consideration of a driving situation of a vehicle.

Accordingly, to prevent the vehicle from quickly returning to the recently passed HP node, the priority update device 320 may lower the priority of the recently passed HP node in inverse proportion to the elapsed time as shown in Equation 3 below.

Equation 3

$$\text{Priority} = \text{Priority}_{origin} - \frac{G_p}{PassingTime}$$

Furthermore, as a HP node is set at a close location in a direction in which a vehicle is currently driven, the priority update device 320 may set the priority to be high. Accordingly, a lower priority may be set for a HP node through which a vehicle passes just before in the traveling direction of the vehicle. A high priority may be set for the HP node located in front of the vehicle in the traveling direction.

At this time, when an empty parking space is recognized by a cognitive sensor while a vehicle is driving inside a parking lot, the priority update device 320 may perform autonomous parking by setting the parking space to the highest priority node.

In addition, the local path generation device 330 may generate an optimal local path from a current location of a vehicle to an empty parking space, by using a potential field-based algorithm.

At this time, the local path generation device 330 may generate a local path by applying various algorithms in common used to generate an optimal local path for reaching a specific destination.

Accordingly, the local path generation device 330 may generate an optimal local path by applying various algorithms capable of solving a rural postman problem (RPP) associated with finding a minimum cost path. Also, it is possible to generate an optimal local path based on the Dijkstra algorithm, which is widely used to search for the shortest path. Moreover, when information about the final destination is received from the infrastructure built in a parking lot, an optimal local path may also be generated by the A-Star (A*) algorithm, which is most frequently used to generate the shortest path.

At this time, the priority for the HP node, through which a vehicle will pass, is set by the priority update device 320. A local path may be generated to preferentially pass through an HP node with a priority higher than an HP node with a lower priority.

Figure 8:
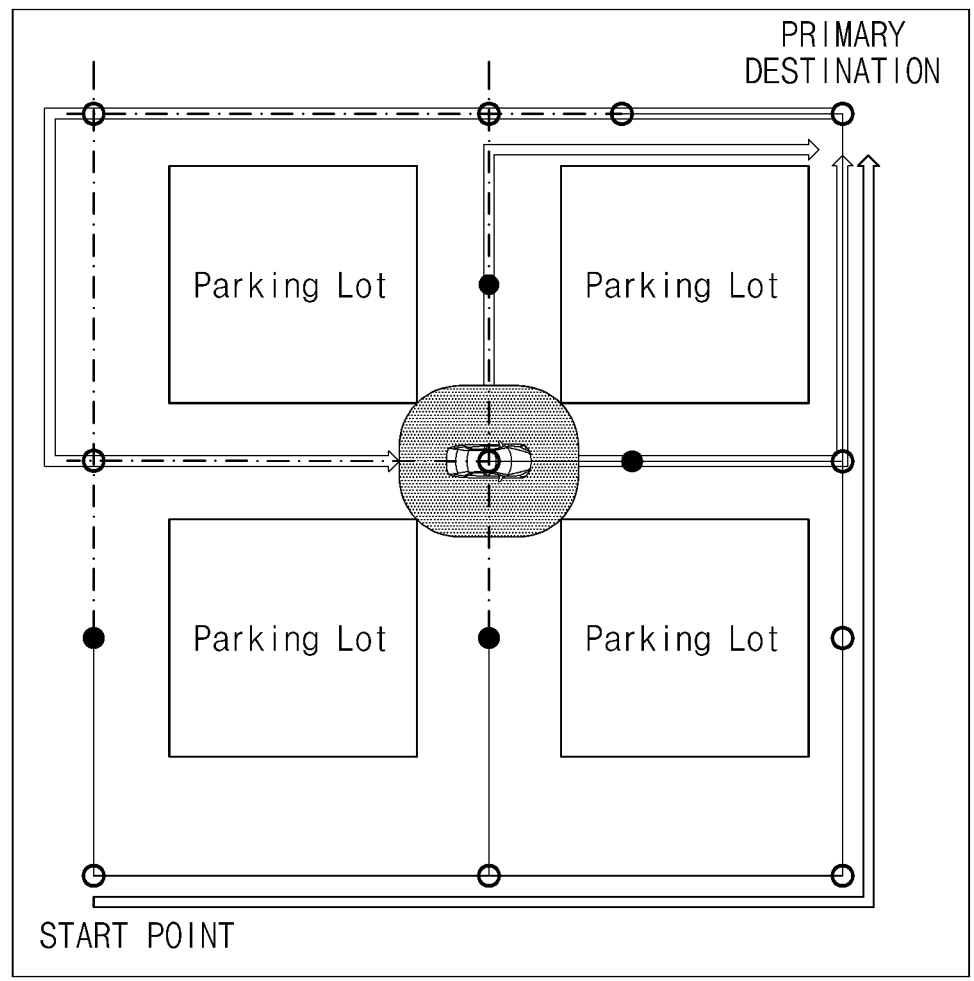
FIG. 8 is an exemplary view illustrating that an optimal path, on which a vehicle moves from a current location to a primary destination, is generated, according to an embodiment of the present disclosure.

As such, as an example of generating a local path so as to preferentially pass through an HP node with a high priority, as shown in FIG. 8, it is described that a local path is generated. The local path refers to a path on which a vehicle passes through a primary movement path from a start point to a first destination, moves along a secondary movement path from the primary destination to a current location, and moves along a tertiary movement path to return to the primary destination again.

The local path generation device 330 may generate a local path presenting a minimum moving distance by calculating the sum of the moving distances from the current location of the vehicle to the primary destination via each HP node. At this time, when movement distances on a plurality of paths for reaching the primary destination are the same as one another, a local path may be generated to include a HP node with high priority.

Accordingly, the secondary movement path has been used more recently than the primary movement path, and thus an HP node included in a part of a local path (No. 2) has a higher priority than an HP node included in a part of a local path (No. 1). Accordingly, the local path generation device 330 may select the local path (No. 2) including the HP node with higher priority as the optimal local path.

As such, it is possible to generate a parking lot map for a global path by setting nodes for the driving free space in a parking lot. In addition, it is possible to update the priority of a HP node through which a vehicle passes in driving. Moreover, it is possible to generate one or more local paths that connect HP nodes to one another. An optimal local path for reaching the desired destination may be easily generated only by comparing priorities of HP nodes included in the generated local path, and thus the parking space may be conveniently found during autonomous parking.

Next, an example of entering a square-shaped parking lot, searching for a parking space for parking a vehicle in the corresponding parking lot and a driving free space where the vehicle is capable of being driven, and setting a parking lot map, for which nodes are set, is described with reference to FIGS. 7A and 7B.

First of all, as shown in the leftmost diagram of FIG. 7A, a vehicle enters the entrance of a parking lot while the cognitive sensor equipped in the vehicle detects the front of the vehicle. At this time, FIG. 7A indicates that the vehicle is driven while maintaining the single directivity of keeping the right (Right Hand Based).

At this time, the free space search device 220 may determine whether there is an obstacle such as another vehicle parked in a short distance, by using an omnidirectional sensor composed of an ultrasound sensor, a camera, and the like provided in the cognitive sensor. When there is no obstacle, the free space search device 220 may recognize that the sensing region of the omnidirectional sensor is a free space.

Also, the HP node setting device 240 sets a HP node at the end of the maximum detection range sensed by the omnidirectional sensor in the free space. Moreover, the free space search device 220 may determine whether there is another vehicle parked at a long distance, by using a remote sensor including a LiDAR sensor provided in the cognitive sensor. When there is no obstacle, the free space search device 220 may also recognize that the sensing region of the remote sensor is a free space.

As such, after the HP node set at the end of the free space detected by the remote sensor, the LP connection line generation device 250 may guide the movement of the subsequent vehicle by generating an LP connection line having a slope in a direction parallel to principal component analysis lines of vehicles parked on a side of the a free space.

Besides, as shown in the middle diagram of FIG. 7A, the free space search device 220 may recognize that there is a free space where an obstacle is not detected on a left side even in the short distance through the omnidirectional sensor at the entrance of a parking lot. The HP node setting device 240 may also set a HP node at the end of the sensing range detected by the omnidirectional sensor. The LP connection line generation device 250 may generate an LP connection line in an unknown region after the HP node.

At this time, in generating the LP connection line, the LP connection line generation device 250 may generate the LP connection line parallel to the principal component analysis line generated by the principal component analysis line generation device 230. In addition, when the parked vehicle is not detected, the LP connection line generation device 250 may generate the LP connection line parallel to a parking line, a marker, or the arrangement of a curb on a road surface, which is obtained by image data or the like.

Furthermore, while it is identified that the free space successively extends to a long distance, based on the cognitive information continuously detected along the driving direction of the vehicle, a HP node may be continuously generated, and extended HP connection lines may be generated by the free space search device 220 and the HP node setting device 240. The generated HP node and the generated HP connection line may generate a global path for the corresponding parking lot.

Afterward, as shown in the rightmost diagram of FIG. 7A, after the vehicle arrives at a corner where the front is blocked and then turns while moving along the contour of the corner wall, a free space is identified based on sensing information from an omnidirectional sensor and a remote sensor in the same manner as a method of entering the parking lot again, and a HP node and a HP connection line are generated.

At this time, when the vehicle passes through the HP node set by the HP node setting device 240 while the vehicle is driven to search for a global path, it is possible to prevent the vehicle from returning during a path search, by updating and storing the priority of the passed HP node in inverse proportion to the lapse of time so as to be lower.

Also, as shown the leftmost diagram of FIG. 7B, when a vehicle arrives at a three-way intersection or an intersection, a free space may be recognized by detecting the side of the vehicle as well as the driving direction of the vehicle in the same manner as a method of entering the parking lot, and then a HP node, a HP connection line, and an LP connection line may be generated.

In addition, as shown in the middle diagram of FIG. 7B, when there is a need to turn again, the vehicle turns at a corner. Afterward, a free space may be recognized and then a HP node, a HP connection line, and an LP connection line may be generated.

Afterward, when all HP nodes are connected to two or more HP connection lines, a path connected to a HP node may be generated such that a vehicle returns to the entrance of a parking lot or a destination by using a new path.

Also, when it is impossible for the vehicle to drive because the HP node where the vehicle is currently located is blocked, the vehicle returns to a HP node, which is located closest to a path the vehicle has already passed, such as a three-way intersection, an intersection, or the like. The global path may be found continuously while the vehicle is driving along a path that has not been driven before.

Next, a cognitive sensor-based autonomous parking route search method according to another embodiment of the present disclosure will be described with reference to FIGS. 9 and 10.

Figure 9:
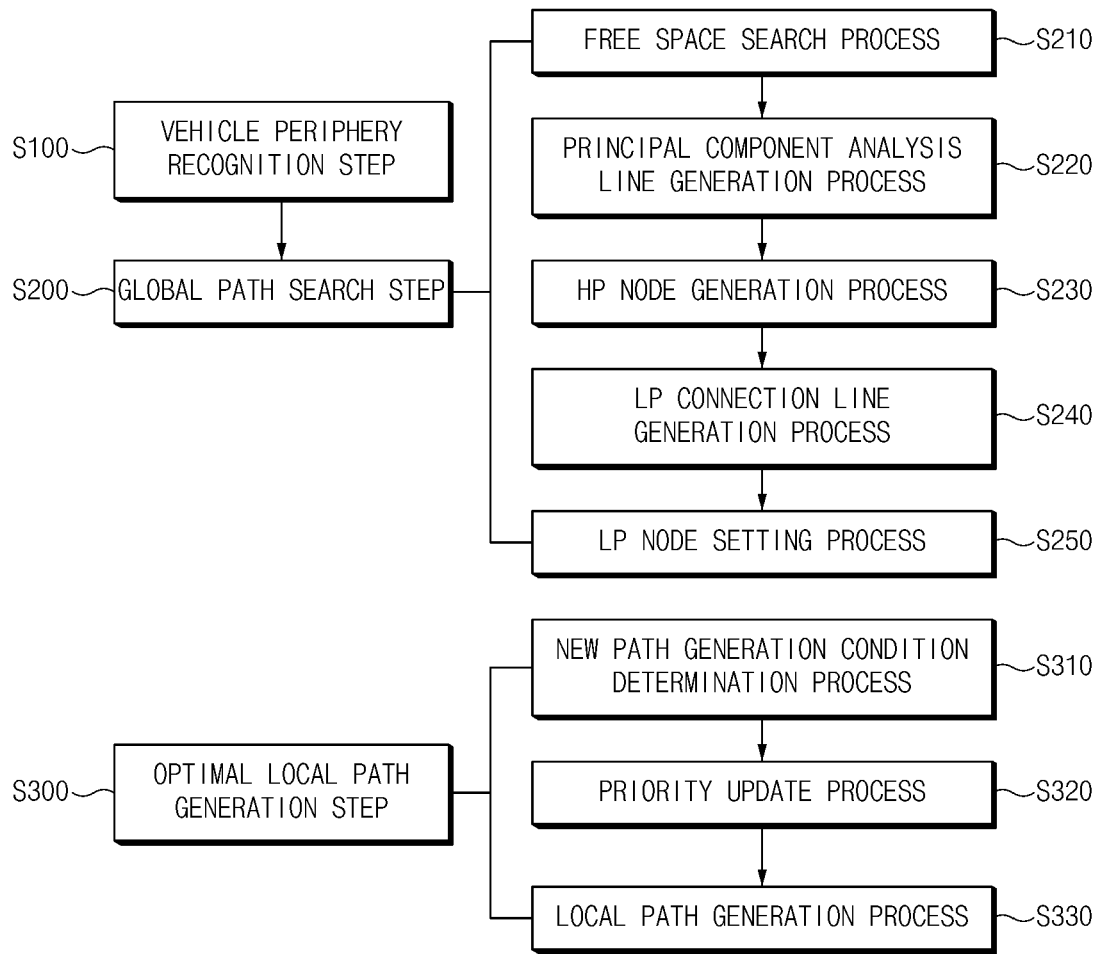
FIG. 9 is a configuration diagram of a cognitive sensor-based autonomous parking route search method according to another embodiment of the present disclosure.
Figure 10:
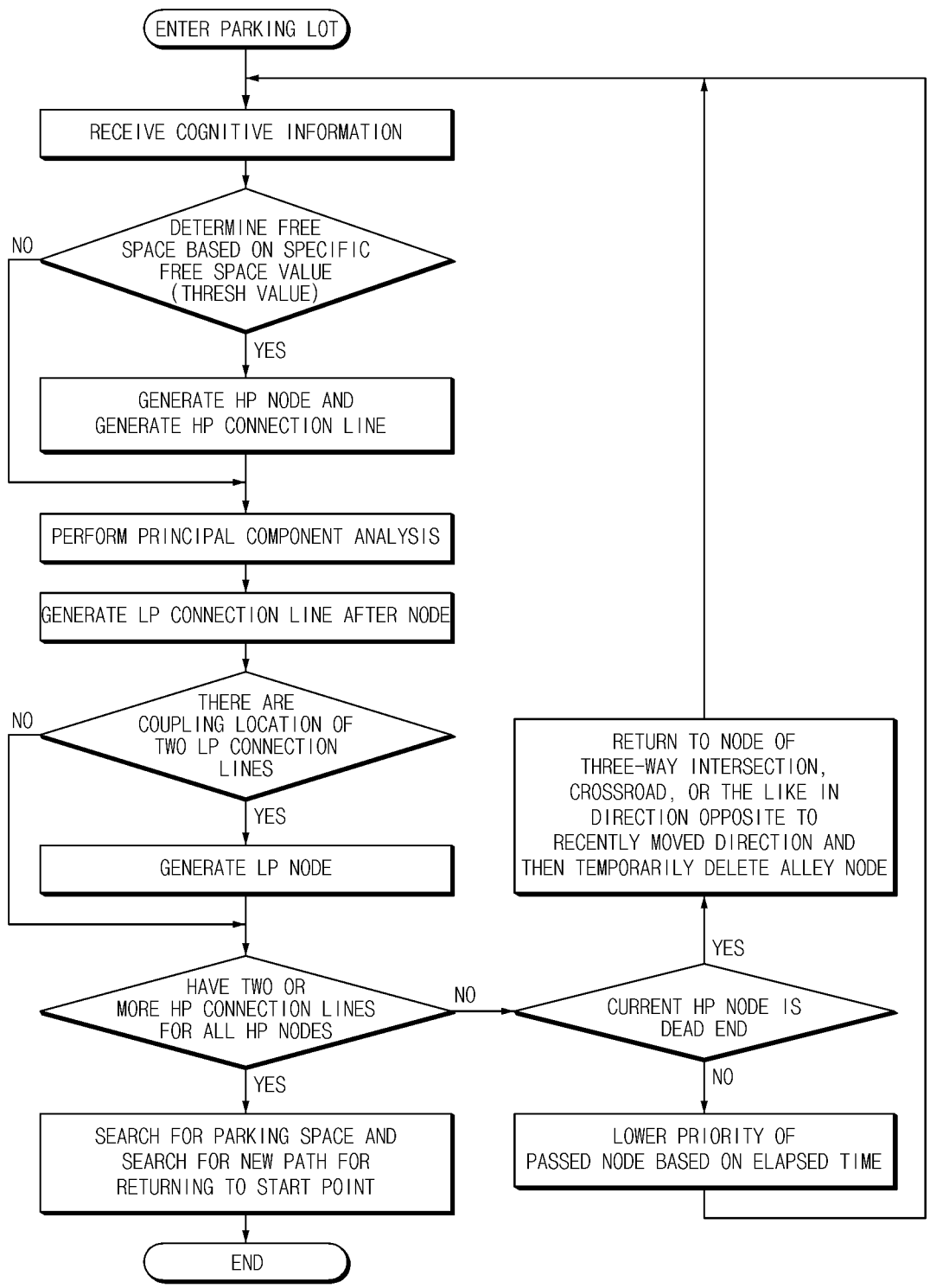
FIG. 10 is a flowchart illustrating a flow of setting nodes to an autonomous parking route, mapping the nodes onto the autonomous parking route, and generating an optimal local path to a parking space, according to an embodiment of the present disclosure.

FIG. 9 is a configuration diagram of a cognitive sensor-based autonomous parking route search method, according to another embodiment of the present disclosure. FIG. 10 is a flowchart illustrating a flow of setting nodes to an autonomous parking route, mapping the nodes onto the autonomous parking route, and generating an optimal path to a parking space, according to an embodiment of the present disclosure.

Referring to FIG. 9, a cognitive sensor-based autonomous parking route search method according to another embodiment of the present disclosure may include a vehicle periphery recognition step S100 of obtaining cognitive information for determining the existence and location of an obstacle by detecting a space around a vehicle being driven inside a parking lot, a global path search step S200 of generating a global path for the inside of the parking lot as a node map, for which nodes are set, by searching for a free space, in which the vehicle is capable of being driven, based on the cognitive information and setting nodes, and an optimal local path generation step S300 of generating an optimal local path from a current location of the vehicle to a destination by connecting the nodes set in the free space while the vehicle moves inside the parking lot.

In the vehicle periphery recognition step S100, it is possible to obtain cognitive information by sensing a space around the vehicle by a cognitive sensor including an ultrasound sensor, a camera, and a LiDAR sensor so as to identify and recognize a free space, in which the vehicle is capable of being driven, and a parking space, in which the driving of the vehicle is restricted, in the interior space of the parking lot.

Also, the global path search step S200 may include a free space search process S210 of dividing a space around the vehicle detected by the cognitive sensor into a plurality of cells, distinguishing between a parking space, in which the obstacle is detected, and a free space, in which the obstacle is not detected, based on the cognitive information, searching for a driving free space, which has a width at which the vehicle is capable of being driven, in the free space, and selecting the driving free space as a part of a global path, and a HP node generation process S230 of generating a HP node at an end of the driving free space, and setting nodes for the driving free space on a parking lot map indicating the inside of the parking lot so as to be stored.

In the free space search process S210, it is possible to divide the space around the vehicle, in which an obstacle is capable of being recognized, into a plurality of cells and to set location information including a unique number of a cell in each divided cell. Accordingly, it is possible to determine whether an obstacle is present in the space around the vehicle, in units of cells.

Furthermore, in the free space search process S210, it is possible to distinguish between a parking space, in which the obstacle is detected, and a free space, in which the obstacle is not detected, based on the cognitive information and to determine that a cell, in which no obstacle is detected, is a free space. In addition, it is possible to determine that a region up to a location where the obstacle is detected is a free space, even in a region where the obstacle is detected. Even when a moving object such as a pedestrian is detected, the space may be recognized as a free space.

Moreover, in the free space search process S210, it is possible to select a free space, in which the lateral distance of the free space is wider than the width of the vehicle, as a driving free space in which a vehicle is capable of moving to search for a global path.

At this time, in the free space search process S210, it is possible to set an obstacle detection point at a location where the obstacle is detected in a cell determined to have an obstacle, and to set the obstacle detection region of a cell including the obstacle detection point as a covariance calculation region.

Also, the global path search step S200 may further include a principal component analysis line generation process S220 of generating a principal component indicating the distribution status of a covariance calculation region set depending on the detection location of an obstacle and generating a principal component analysis line indicating the directivity of the covariance calculation region having a probability of detecting the obstacle having a specific level or more.

In the principal component analysis line generation process S220, it is possible to derive a principal component analysis line as an eigenvector ($e_1$) indicating the directivity of a region in which the probability of detecting an obstacle is not less than a specific level.

At this time, in the principal component analysis line generation process S220, it is possible to determine an angle corresponding to the average of the two principal component analysis lines as a final direction of the principal component analysis line when the two principal component analysis lines are generated. The final direction of the principal component analysis line may be provided as a reference direction in which the LP connection line is generated later.

Furthermore, in the HP node generation process S230, it is possible to set a HP node, to which a high priority is assigned to the farthest point where an obstacle is not recognized in a driving free space selected in the free space search process S210 so as to be stored.

Moreover, in the HP node generation process S230, it is possible to generate an HP connection line connecting the center of the vehicle to the HP node set in the driving free space so as to be stored.

As such, the HP connection line connecting the HP nodes may form a driving route on which the vehicle moves in the parking lot, and thus may form a part of the global path that is a path on which the vehicle is driven on the entire parking lot.

Furthermore, in the free space search process S210, it is possible to enhance the repulsive force potential field recognized in a space with an obstacle by generating a principal component analysis force potential field having a specific radius at a principal component analysis start point location when two or more free spaces having a travelable width are recognized.

In other words, when it is recognized that there is an obstacle on both sides of the front of a vehicle while the vehicle is moved by autonomous driving, the vehicle maintains a current driving direction rather than a direction where the obstacle is present, and thus the space with obstacles may be recognized by generating a principal component analysis force potential field at the start point location of the principal component analysis.

At this time, in the free space search process S210, it is possible to set a radius of the start point of the principal component analysis to be narrow when a lot of obstacles are detected in a front location close to a current location of the vehicle, which corresponds to the number of a cell at which an obstacle is detected based on the cognitive information. It is possible to set a radius of the principal component analysis start point to be large when the number of the cell where an obstacle is detected corresponds to the rear location.

Accordingly, a principal component analysis force potential field with a small radius may be generated when a lot of obstacles are detected at the front location of the cell. For the purpose of avoiding the obstacles, the driving free space may be selected such that the vehicle moves to the side or turns to the left or right. When a lot of obstacles are detected at the location behind the cell, a principal component analysis start point with a large radius may act as a principal component analysis force potential field for preventing the approach of a vehicle.

In the free space search process S210, it is possible to search for a local minimum indicating a local minimum value in the entire potential field (F) calculated by Equation 2 and to select a driving free space by determining whether a space where a vehicle is capable of moving is secured around the local minimum when two or more free spaces with a travelable width are recognized.

Furthermore, the global path search step S200 may further include an LP connection line generation process S240 of generating an LP connection line parallel to the principal component analysis line with respect to a space after the HP node.

That is, the LP connection line may be used to present a criterion for a driving route after the HP node so as to be parallel to the principal component analysis line, and may provide a guide for generating a path by a potential field-based algorithm in the optimal local path generation step S300.

Furthermore, the global path search step S200 may further include an LP node setting process S250 of setting a point, at which the LP connection line contacts another connection line or node, to an LP node.

That is, unlike the HP node set within a range capable of being directly detected by a cognitive sensor provided in a vehicle, the LP node is set at a point, at which an LP connection line generated for a region out of a detection range of the cognitive sensor is connected to another connection line or node.

Accordingly, it is possible to set an LP node capable of being used to generate a local path even in a region in which a vehicle is not directly driven or an undetected region. For this reason, although a vehicle is not driven in all the spaces within the parking lot, a global path for the parking lot may be generated based on a HP connection line and an LP connection line that connect the HP node and the LP node.

Furthermore, the optimal local path generation step S300 may include a new path generation condition determination process S310 of monitoring a connection line connected to the HP node and allowing a new local path to be generated when it is determined that all HP nodes are connected to two or more HP connection lines, a priority update process S320 of lowering a priority of the HP node, through which a vehicle passes while being driven inside the parking lot, in inverse proportion to the elapsed time, and a local path generation process S330 of generating a path from a current location of the vehicle to a destination based on a potential field, and generating a path with a high priority of the HP node, through which the vehicle passes to reach the destination, as a local path.

In the new path generation condition determination process S310, it is possible to control the generation of a new local path capable of reaching the destination without returning to the passed path when it is determined that two or more HP connection lines are connected to all HP nodes generated based on the sensing information obtained in driving inside the parking lot.

Furthermore, in the priority update process S320, it is possible to update a priority of the HP node, through which the vehicle driven inside the parking lot preferentially passes rather than other places, in consideration of a driving situation of a vehicle.

Accordingly, in the priority update process S320, it is possible to lower the priority of a HP node, through which a vehicle recently passed, in inverse proportion to the elapsed time so as to prevent the vehicle from quickly returning to the recently passed HP node. Accordingly, the priority of the recently passed HP node has a higher priority than that of the previously passed HP node.

Furthermore, in the priority update process S320, it is possible to set the priority to be high as a HP node is set at a close location in a direction in which a vehicle is currently driven. Accordingly, a lower priority may be set for a HP node through which a vehicle passes just before in the traveling direction of the vehicle. A high priority may be set for the HP node located in front of the vehicle in the traveling direction.

In addition, in the local path generation process S330, it is possible to generate an optimal local path from a current location of a vehicle to an empty parking space, by using a potential field-based algorithm.

At this time, in the local path generation process S330, it is possible to generate a local path by applying various algorithms in common used to generate an optimal local path for reaching a specific destination.

At this time, the priority for the HP node, through which a vehicle will pass, is set in the priority update process S320. A local path may be generated to preferentially pass through an HP node with a priority higher than an HP node with a lower priority.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for the illustrative purpose. The scope of protection of the present disclosure should be construed by the attached claims, and all equivalents thereof should be construed as being included within the scope of the present disclosure.

According to an embodiment of the present disclosure, it is possible to generate a parking lot map by directly obtaining a global path in a parking lot for performing autonomous parking by using cognitive information obtained by a cognitive sensor such as an ultrasound sensor, a camera, and a LiDAR sensor, which are already installed in a vehicle. Accordingly, even in an environment where infrastructure for supporting autonomous parking is not built or in a state where the built Infrastructure malfunctions, autonomous parking may be stably performed.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cognitive sensor-based autonomous parking route search system, the system comprising:
   a cognitive sensor configured to obtain cognitive information for determining an existence and a location of an obstacle by sensing a space around a vehicle being driven in an inside of a parking lot;
   a global path search module configured to generate a global path for the inside of the parking lot as a node map by searching for a free space, in which the vehicle is capable of being driven, based on the cognitive information and by setting a node in the free space; and
   an optimal local path generation module configured to generate an optimal local path from a current location of the vehicle to a destination by connecting the node set in the free space while the vehicle moves inside the parking lot;
   wherein the global path search module comprises:
      a cell setting device configured to determine whether the obstacle is recognized for each cell by dividing the space around the vehicle detected by the cognitive sensor into a plurality of cells;
      a free space search device configured to distinguish between a parking space, in which the obstacle is detected, and a free space, in which the obstacle is not detected, based on the cognitive information, to search for a driving free space, which has a width at which the vehicle is capable of being driven, in the free space, and to select the driving free space as a part of the global path; and
      a high-priority (HP) node setting device configured to generate a HP node at an end of the driving free space, and to set the HP node for the driving free space on a parking lot map indicating the inside of the parking lot so as to be stored;
   wherein the HP node setting device is configured to generate an HP connection line connecting a center of the vehicle to an HP node set in the driving free space so as to be stored; and
   wherein the optimal local path generation module comprises:
      a priority update device configured to lower a priority of the HP node, through which the vehicle passes while being driven inside the parking lot, in inverse proportion to elapsed time; and a local path generation device configured to generate a path from the current location of the vehicle to the destination based on a potential field and to generate a path with a high priority of the HP node through which the vehicle passes to reach the destination as a local path.

2. The system of claim 1, wherein the global path search module comprises a principal component analysis line generation device configured to:
generate a principal component indicating a distribution status of a covariance calculation region set depending on a detection location of the obstacle; and
generate a principal component analysis line indicating directivity of the covariance calculation region having a probability of detecting the obstacle having a specific level or more.

3. The system of claim 2, wherein the free space search device is configured to enhance a repulsive force potential field recognized in a space with the obstacle by generating a principal component analysis force potential field having a specific radius at a principal component analysis start point location when two or more free spaces having a travelable width are recognized.

4. The system of claim 2, wherein the global path search module further comprises a low-priority (LP) connection line generation device configured to generate an LP connection line parallel to the principal component analysis line with respect to a space after the HP node.

5. The system of claim 4, wherein the LP connection line generation device is configured to generate the LP connection line so as to be parallel to an average of angles formed between two principal component analysis lines when the two principal component analysis lines are generated on both sides of a front of the vehicle.

6. The system of claim 4, wherein the global path search module further comprises an LP node setting device configured to set a point, at which the LP connection line contacts another connection line or another node, to an LP node.

7. The system of claim 1, wherein the optimal local path generation module further comprises a path generation condition determination device configured to cause a new local path to be generated when it is determined that all HP nodes are connected to two or more HP connection lines by monitoring a connection line connected to the HP node.

8. The system of claim 1, wherein the optimal local path generation module is configured to cause a new path passing through one or more LP nodes to be generated as an optimal path when a start node is capable of being reached by using a new path via the LP node other than a path on which the vehicle is moved while being driven.

9. The system of claim 1, wherein the priority update device is configured to perform autonomous parking by setting the parking space to a highest priority node when the parking space that is empty is recognized by the cognitive sensor in driving inside the parking lot.

10. A method of searching for an autonomous parking route based on a cognitive sensor, the method comprising:
obtaining cognitive information for determining an existence and a location of an obstacle by sensing a space around a vehicle being driven in an inside of a parking lot;
generating a global path for the inside of the parking lot as a node map by searching for a free space, in which the vehicle is capable of being driven, based on the cognitive information and by setting a node in the free space; and
generating an optimal local path from a current location of the vehicle to a destination by connecting the node set in the free space while the vehicle moves inside the parking lot;
wherein generating the global path comprises:
dividing the space around the vehicle;
distinguishing between a parking space, in which the obstacle is detected, and a free space, in which the obstacle is not detected, based on the cognitive information, searching for a driving free space, which has a width at which the vehicle is capable of being driven, in the free space, and selecting the driving free space as a part of the global path; and
generating a high-priority (HP) node at an end of the driving free space, and setting the HP node for the driving free space on a parking lot map indicating the inside of the parking lot so as to be stored;
wherein generating the global path further comprises generating a low-priority (LP) connection line parallel to a principal component analysis line with respect to a space after the HP node; and
wherein generating the optimal local path comprises:
lowering a priority of the HP node, through which the vehicle passes while being driven inside the parking lot, in inverse proportion to elapsed time; and
generating a path from the current location of the vehicle to the destination based on a potential field and generating a path with a high priority of the HP node through which the vehicle passes to reach the destination as a local path.

11. The method of claim 10, wherein searching for the driving free space comprises enhancing a repulsive force potential field recognized in a space with the obstacle by generating a principal component analysis force potential field having a specific radius at a principal component analysis start point location when two or more free spaces having a travelable width are recognized.

12. The method of claim 10, wherein generating the global path further comprises:
generating a principal component indicating a distribution status of a covariance calculation region set depending on a detection location of the obstacle; and
generating the principal component analysis line indicating directivity of the covariance calculation region having a probability of detecting the obstacle having a specific level or more.

13. The method of claim 10, wherein generating the optimal local path further comprises causing a new local path to be generated when it is determined that all HP nodes are connected to two or more HP connection lines by monitoring a connection line connected to the HP node.

14. A cognitive sensor-based autonomous parking route search system, the system comprising:
a cognitive sensor configured to obtain cognitive information for determining an existence and a location of an obstacle by sensing a space around a vehicle being driven in an inside of a parking lot;
a global path search module configured to generate a global path for the inside of the parking lot as a node map by searching for a free space, in which the vehicle is capable of being driven, based on the cognitive information and by setting a node in the free space; and
an optimal local path generation module configured to generate an optimal local path from a current location of the vehicle to a destination by connecting the node set in the free space while the vehicle moves inside the parking lot;

wherein the global path search module comprises:
a cell setting device configured to determine whether the obstacle is recognized for each cell by dividing the space around the vehicle detected by the cognitive sensor into a plurality of cells;
a free space search device configured to distinguish between a parking space, in which the obstacle is detected, and a free space, in which the obstacle is not detected, based on the cognitive information, to search for a driving free space, which has a width at which the vehicle is capable of being driven, in the free space, and to select the driving free space as a part of the global path; and
a high-priority (HP) node setting device configured to generate a HP node at an end of the driving free space, and to set the HP node for the driving free space on a parking lot map indicating the inside of the parking lot so as to be stored;

wherein the global path search module further comprises:
a principal component analysis line generation device configured to generate a principal component indicating a distribution status of a covariance calculation region set depending on a detection location of the obstacle and to generate a principal component analysis line indicating directivity of the covariance calculation region having a probability of detecting the obstacle having a specific level or more;
a low-priority (LP) connection line generation device configured to generate an LP connection line parallel to the principal component analysis line with respect to a space after the HP node;
an LP node setting device configured to set a point, at which the LP connection line contacts another connection line or another node, to an LP node; and wherein the optimal local path generation module comprises:
a priority update device configured to lower a priority of the HP node, through which the vehicle passes while being driven inside the parking lot, in inverse proportion to elapsed time; and a local path generation device configured to generate a path from the current location of the vehicle to the destination based on a potential field and to generate a path with a high priority of the HP node through which the vehicle passes to reach the destination as a local path.

15. The system of claim 14, wherein the HP node setting device is configured to generate an HP connection line connecting a center of the vehicle to an HP node set in the driving free space so as to be stored.

16. The system of claim 14, wherein the free space search device is configured to enhance a repulsive force potential field recognized in a space with the obstacle by generating a principal component analysis force potential field having a specific radius at a principal component analysis start point location when two or more free spaces having a travelable width are recognized.

17. The system of claim 14, wherein the LP connection line generation device is configured to generate the LP connection line so as to be parallel to an average of angles formed between two principal component analysis lines when the two principal component analysis lines are generated on both sides of a front of the vehicle.

18. The system of claim 14, wherein the optimal local path generation module further comprises a path generation condition determination device configured to cause a new local path to be generated when it is determined that all HP nodes are connected to two or more HP connection lines by monitoring a connection line connected to the HP node.

19. The system of claim 14, wherein the optimal local path generation module is configured to cause a new path passing through one or more LP nodes to be generated as an optimal path when a start node is capable of being reached by using a new path via the LP node other than a path on which the vehicle is moved while being driven.

20. The system of claim 14, wherein the priority update device is configured to perform autonomous parking by setting the parking space to a highest priority node when the parking space that is empty is recognized by the cognitive sensor in driving inside the parking lot.

* * * * *